United States Patent
Haghighat et al.

(10) Patent No.: US 12,050,662 B2
(45) Date of Patent: Jul. 30, 2024

(54) GENERATIVE FOOD DONENESS PREDICTION

(71) Applicant: WHIRLPOOL CORPORATION, Benton Harbor, MI (US)

(72) Inventors: Mohammad Haghighat, San Jose, CA (US); Seth Herndon, Osceola, IN (US); Padmanabha C. Jakkahalli, Los Gatos, CA (US); Mohammad Laskar, Sunnyvale, CA (US); Harshil Shah, Sunnyvale, CA (US); Saqib N. Shamsi, Dehradun (IN); Bereket Sharew, Santa Clara, CA (US)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 353 days.

(21) Appl. No.: 17/468,506

(22) Filed: Sep. 7, 2021

(65) Prior Publication Data

US 2023/0075208 A1    Mar. 9, 2023

(51) Int. Cl.
| | |
|---|---|
| *G06K 9/00* | (2022.01) |
| *F24C 7/08* | (2006.01) |
| *G06F 18/21* | (2023.01) |
| *G06F 18/2413* | (2023.01) |
| *G06N 3/045* | (2023.01) |

(52) U.S. Cl.
CPC ............ *G06F 18/2413* (2023.01); *F24C 7/08* (2013.01); *G06F 18/2178* (2023.01); *G06N 3/045* (2023.01)

(58) Field of Classification Search
CPC ........ F24C 7/08; F24C 7/085; G06F 18/2178; G06N 3/045; G06N 3/0455; G06N 3/047; G06N 3/094; G06N 3/0475
See application file for complete search history.

(56) References Cited

U.S. PATENT DOCUMENTS

| | | | | |
|---|---|---|---|---|
| 9,538,880 | B2 * | 1/2017 | Riefenstein | ............ H05B 6/687 |
| 10,605,463 | B2 * | 3/2020 | Abdoo | ...................... A23L 5/15 |
| 10,739,013 | B2 * | 8/2020 | Bhogal | .................... F24C 3/124 |
| 11,051,370 | B2 * | 6/2021 | Imai | .......................... F24C 7/08 |
| 11,593,717 | B2 * | 2/2023 | Bhogal | .................. G06N 20/20 |
| 2016/0327279 | A1 * | 11/2016 | Bhogal | ................. F24C 15/008 |
| 2018/0324908 | A1 | 11/2018 | Denker et al. | |
| 2019/0110638 | A1 | 4/2019 | Li et al. | |
| 2019/0200797 | A1 * | 7/2019 | Diao | ..................... G05B 19/42 |

(Continued)

FOREIGN PATENT DOCUMENTS

| | | | | |
|---|---|---|---|---|
| WO | WO-2020074478 A1 * | 4/2020 | ............ F24C 15/322 |
| WO | 2021145511 A1 | 7/2021 | |

OTHER PUBLICATIONS

Papadopoulos et al., How to Make a Pizza: Learning a Compositional Layer-Based GAN Model, http://pizzagan.csail.mit.edu.

(Continued)

*Primary Examiner* — Shervin K Nakhjavan
(74) *Attorney, Agent, or Firm* — Brooks Kushman P.C.

(57) ABSTRACT

Controlling a heating process is provided. An image of a raw food item is captured. Using a generative model, synthesized images of the cooked food are generated at different levels of doneness based on the raw image. A selection of one of the synthesized cooked images is received. The food item is cooked to the levels of doneness corresponding to the one of the synthesized cooked images.

20 Claims, 6 Drawing Sheets

(56) References Cited

U.S. PATENT DOCUMENTS

| | | | |
|---|---|---|---|
| 2020/0288909 A1* | 9/2020 | Kaiser | G06N 20/00 |
| 2021/0207811 A1 | 7/2021 | Adam et al. | |
| 2021/0228022 A1* | 7/2021 | Liu | F24C 7/081 |
| 2021/0353097 A1* | 11/2021 | Jeong | H05B 6/681 |
| 2022/0142400 A1* | 5/2022 | Kim | F24C 3/128 |
| 2022/0196889 A1* | 6/2022 | Marinkovich | G05D 1/0297 |
| 2022/0273134 A1* | 9/2022 | Du | G06V 10/26 |
| 2022/0273136 A1* | 9/2022 | Du | G05B 19/0426 |
| 2022/0325896 A1* | 10/2022 | Jeong | G06Q 50/10 |
| 2023/0089725 A1* | 3/2023 | Han | G06V 10/82 99/325 |
| 2024/0044498 A1* | 2/2024 | Adam | G06T 7/0004 |

OTHER PUBLICATIONS

Hao et al., Learning Cross-Modal Embeddings with Adversarial Networks for Cooking Recipes and Food Images.
Han et al., CookGAN: Meal Image Synthesis from Ingredients.
Harashima et al., Cookpad Image Dataset: An Image Collection as Infrastructure for Food Research, SIGIR'17, Aug. 7-11, 2017, Shinjuku, Tokyo, Japan, https://cookpad.com.
Sabini et al., GAN-stronomy: Generative Cooking with Conditional DCGANs.
Zhu et al., R2GAN: Cross-Modal Recipe Retrieval with Generative Adversarial Network.

* cited by examiner

GENERATIVE FOOD DONENESS PREDICTION

TECHNICAL FIELD

Aspects of the disclosure generally relate to generative food doneness prediction.

BACKGROUND

Terms such as light, medium, and dark, or raw, medium, and well-done are used to discuss how much cooking time a food item should undergo. However, these terms are subjective and lack exact definitions. For example, one person may say a piece of toast is medium while another person may say the same piece of toast is dark.

SUMMARY

In one or more illustrative examples, a method for controlling a heating process is provided. A raw image of a food item is captured. Using a generative model, synthesized images of the food item are generated cooked to different levels of doneness based on the raw image. A selection of one of the synthesized images is received. The food item is cooked to the levels of doneness corresponding to the one of the synthesized images of cooked food.

In some examples, a doneness detection model may be utilized to determine a target doneness level for the food item based on one of the synthesized images of the cooked food. The doneness model may be utilized to determine a current doneness level of the food item according to an in-progress image captured of the food item. The current doneness level and the target doneness level may be utilized to control a heating system to cook the food item.

In some examples, a cooking cycle may be initiated to begin cooking the food item by activating the heating system. The cooking cycle may be completed responsive to the current doneness level reaching at least a minimum doneness likelihood threshold specified by the target doneness level.

In some examples, completing the cooking cycle may include one or more of deactivating the heating system, setting the heating system to a warming mode to keep the food item ready for use, or providing an alert to indicate that preparation of the food item is complete. In some examples, training the generative model may include using a training data set of images of food items at different levels of doneness. In some examples, the generative model may be a Generative Adversarial Network (GAN). In some examples, the generative model may be a Variational AutoEncoder (VAE).

In one or more illustrative examples, a smart oven for controlling a heating process is provided. The smart oven includes a camera, a heating system, a processor, programmed to capture a raw image of a food item; generate, using a generative model, synthesized images of the cooked food item cooked to different levels of doneness based on the raw image; receive a selection of one of the synthesized images; and cook the food item to the levels of doneness corresponding to the one of the synthesized image of the cooked food.

In some examples, the processor is further programmed to utilize a doneness detection model to determine a target doneness level for the food item based on the one of the synthesized images of the cooked food; utilize the doneness detection model to determine a current doneness level of the food item according to an image captured of the food in real time; and utilize the current doneness level and the target doneness level to control a heating system to cook the food item.

In some examples, the processor is further programmed to initiate a cooking cycle to begin cooking the food item by activating the heating system; and complete the cooking cycle responsive to the current doneness level reaching at least a minimum doneness likelihood threshold specified by the target doneness level.

In some examples, completing the cooking cycle includes one or more of deactivating the heating system, setting the heating system to a warming mode to keep the food item ready for use, or providing an alert to indicate that preparation of the food item is complete. In some examples, the generative model is trained using a training data set of images of food items at different levels of doneness. In some examples, the generative model is a Generative Adversarial Network (GAN). In some examples, the generative model is a Variational AutoEncoder (VAE).

In one or more illustrative examples, a non-transitory computer-readable medium includes instructions controlling a heating process that, when executed by a processor of a smart oven, cause the smart oven to perform operations including to capture a raw image of a food item; generate, using a generative model, synthesized images of the cooked food item cooked to different levels of doneness based on the raw image; receive a selection of one of the synthesized images; and cook the food item to the levels of doneness corresponding to the one of the synthesized images of cooked food.

In some examples, the medium further includes instructions that, when executed by the processor of the smart oven, cause the smart oven to perform operations including to utilize a doneness detection model to determine a target doneness level for the food item based on the one of the synthesized images of cooked food; utilize the doneness detection model to determine a current doneness level of the food item according to an image captured of the food item in real time; and utilize the current doneness level and the target doneness level to control a heating system to cook the food item.

In some examples, the medium further includes instructions that, when executed by the processor of the smart oven, cause the smart oven to perform operations including to initiate a cooking cycle to begin cooking the food item by activating the heating system; and complete the cooking cycle responsive to the current doneness level reaching at least a minimum doneness likelihood threshold specified by the target doneness level.

In some examples, completing the cooking cycle includes one or more of deactivating the heating system, setting the heating system to a warming mode to keep the food item ready for use, or providing an alert to indicate that preparation of the food item is complete.

In some examples, the medium further includes instructions that, when executed by the processor of a server, cause the server to perform operations including to train the generative model using a training data set of images of food items at different levels of doneness and deploy the generative model to the smart oven. In some examples, the generative model is one of a Generative Adversarial Network (GAN) or a Variational AutoEncoder (VAE).

BRIEF DESCRIPTION OF THE DRAWINGS

The embodiments of the present disclosure are pointed out with particularity in the appended claims. However.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A smart oven may receive a food item to be cooked. The smart oven may generate images of the food item as it would appear were it cooked to different doneness levels. The smart oven may display these generated images of the food item for selection by the user. This may allow the user to select an image that shows a desired cooking level for the food item. A doneness subsystem of the smart oven may watch the food item to determine the current doneness of the food item as it is cooked. The smart oven may determine that the food item has reached the selected cooking level and may complete the cooking process and/or notify the user. Accordingly, the smart oven may cook the food item to the desired level of doneness.

Figure 1:
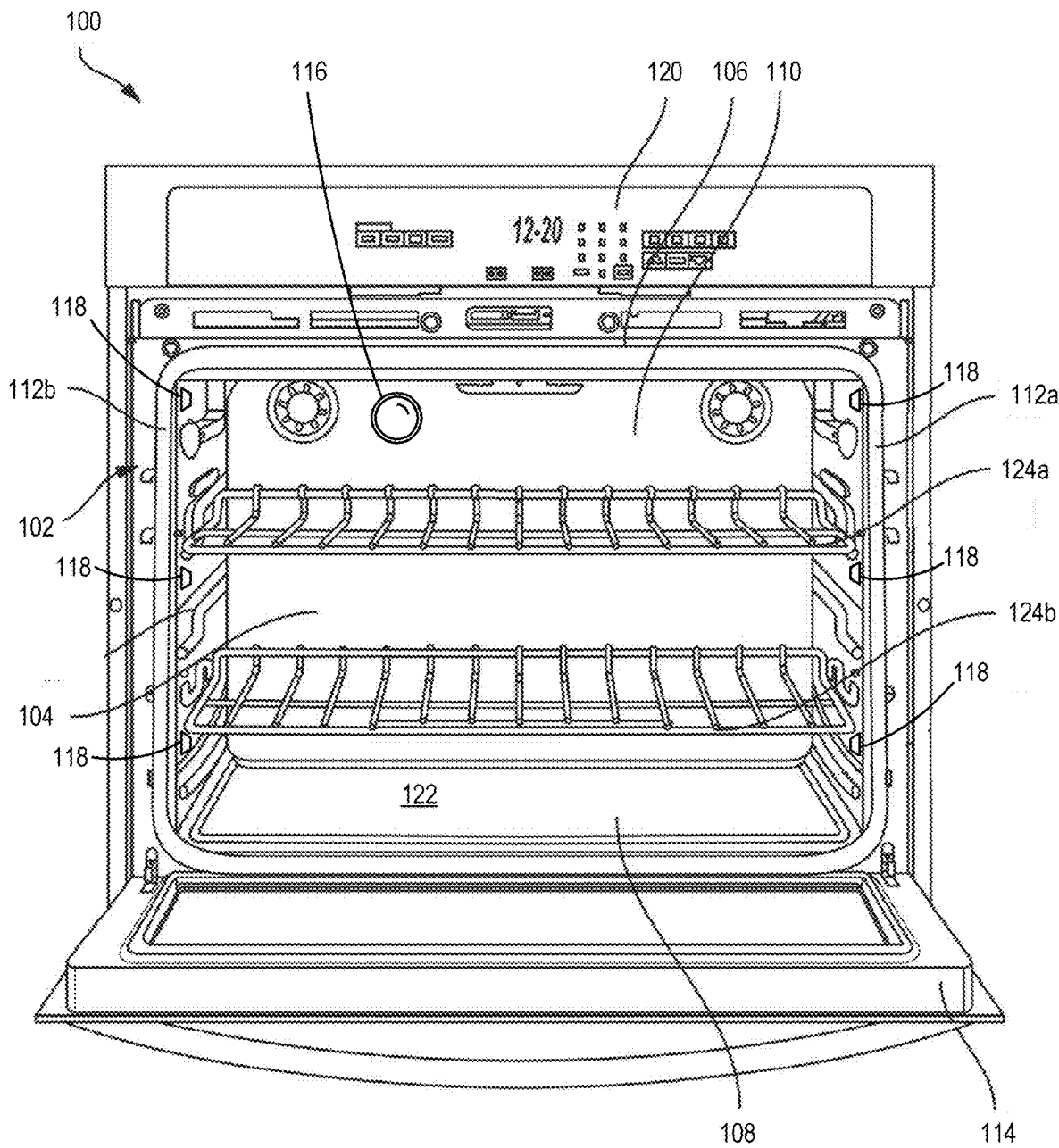
FIG. 1 illustrates an example front perspective view of an oven configured to perform real-time automated cooking cycles using generative food doneness prediction.

FIG. 1 illustrates an example front perspective view of a smart oven 100 configured to perform real-time automated cooking cycles. The smart oven 100 may be one of various cooking appliances, such as a conventional oven, a convection oven, a conduction oven, a microwave oven, a toaster oven. In some examples, the smart oven 100 may be a function-specific oven, such as a roaster oven, a pizza oven, etc. The smart oven 100 may be standalone in some cases, while in other cases the oven may be built-in or a component of a combination oven and stove top.

The smart oven 100 may form a cabinet 102 and define a cavity 104 having a cavity top 106, cavity bottom 108, cavity back 110, and side walls 112. A door assembly 114 may be hinged at a front of the cavity bottom 108 to permit access to the cavity 104. The door assembly 114 may include a window and a handle and may hermetically seal the cavity 104 when the door is in a closed position. It should be noted that this is an example, and smart ovens 100 with different types of doors may be used. For instance, a door may be hinged at a side instead of the bottom. A door sensor may be arranged on the door or the cavity 104 to detect an open and closed position of the door of the door assembly 114.

The cavity 104 may be configured to receive food items for cooking, baking, and/or broiling during a cooking cycle. During the cooking cycle, the food items may "cook" within the cavity 104 and reach various forms of doneness. A camera 116 may be arranged within the cavity 104 and be configured to capture images of the contents of the cavity 104. For example, the camera 116 may capture images of a raw food item to be cooked. As another example, the camera 116 may capture images of the food item during the cooking cycle. The cavity 104 may also include temperature sensors 118 for determining the air temperature within the cavity 104 during cooking. The smart oven 100 may further include a user interface 120 configured to receive user input with respect to cycles or other oven operation. The user interface 120 may also provide information to the user such as cook time, temperature, etc.

The smart oven 100 may include a heating system 122 for heating the cavity 104 during cooking. The heating system 122 may include one or more heating elements, such as a gas heating element or an electric heating element. In one example, the heating system 122 may include a first heating element at the bottom of the cavity 104, and a second heating element at the top of the cavity 104. In yet a further example, heating elements may be arranged between the cabinet 102 and the cavity back 110 and/or the cavity top 106.

The smart oven 100 may include one or more racks 124 within the cavity 104 for supporting the food items during cooking. As shown by way of example in FIG. 1, the oven may include a top rack 124a and a bottom rack 124b (collectively referred to herein as racks 124). It should be noted that while two racks 124 are shown, smart ovens 100 with more or fewer racks 124 are possible. Regardless of quantity, the racks 124 may rest on side rails 132 arranged along the side walls 112. The side rails 132 may extend parallel or generally parallel with the cavity top 106 and cavity bottom 108 along the side walls 112 at spaced intervals. The side rails 132 may extend up the height of the side walls 112 to allow for varying positions of the racks 124 within the cavity 104. For each side rail 132 arranged on a first side wall 112a, a corresponding side rail 132 is arranged on an opposite second side wall 112b (generally at the same relative height) so that the rack 124 may be evenly maintained on each side thereof.

Figure 2:
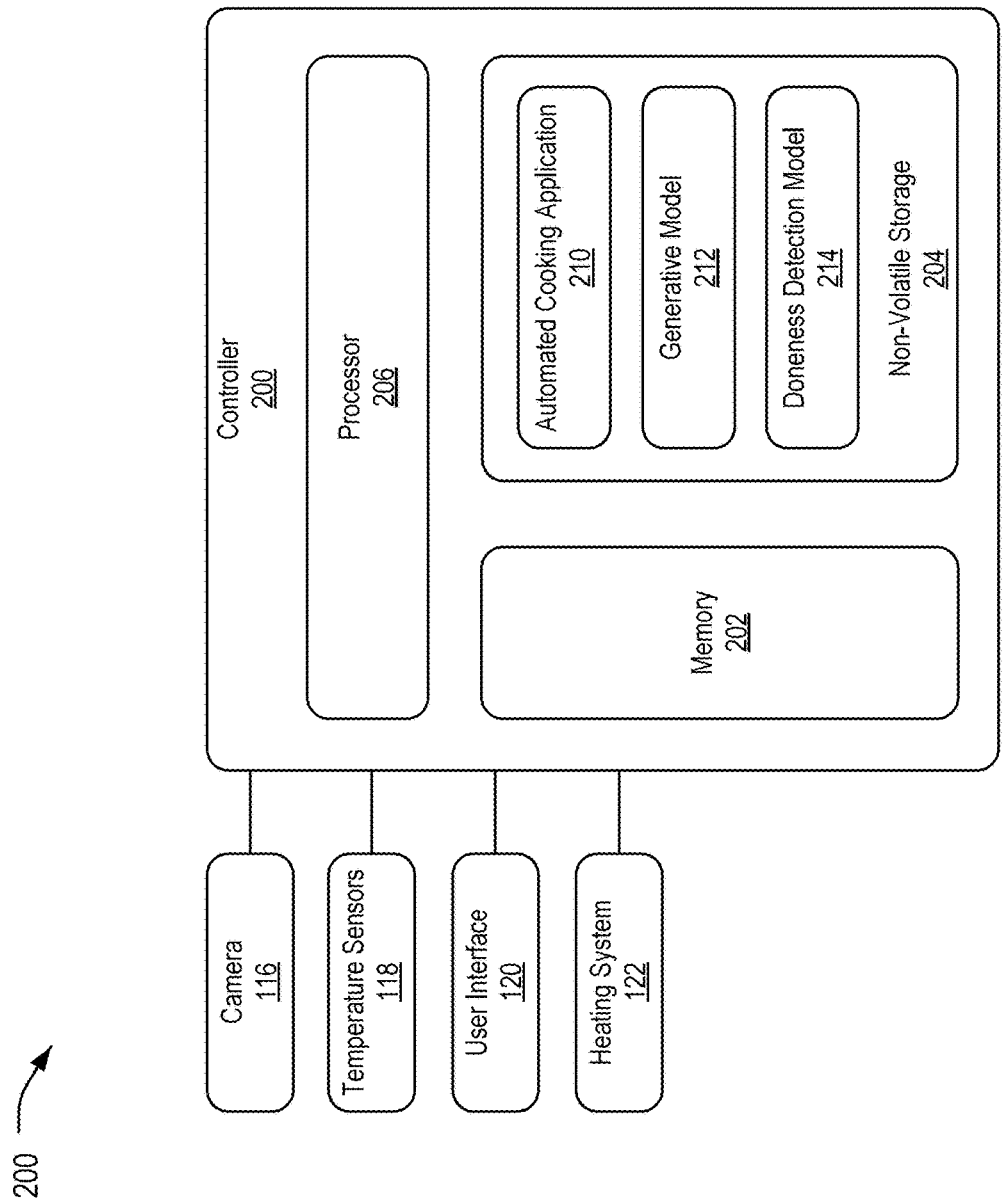
FIG. 2 illustrates an example controller configured to operate the components of the smart oven to perform real-time automated cooking cycles.

FIG. 2 illustrates an example controller 200 configured to operate the components of the smart oven 100 to perform real-time automated cooking cycles. The controller 200 may include a memory 202, a non-volatile storage 204, and a processor 206. The non-volatile storage 204 may store operations for an automated cooking application 210.

The memory 202 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information. The non-volatile storage 204 may include one or more persistent data storage devices such as a hard drive, optical drive, tape drive, non-volatile solid-state device, cloud storage or any other device capable of persistently storing information.

The processor 206 may include one or more microprocessors, micro-controllers, digital signal processors, microcomputers, central processing units (CPU), graphical processing units (GPU), tensor processing units (TPU), field programmable gate arrays, programmable logic devices, state machines, logic circuits, analog circuits, digital circuits, or any other devices that manipulate signals (analog or digital) based on computer-executable instructions residing in memory 202.

The processor 206 may be configured to read into memory 202 and execute computer-executable instructions residing in the non-volatile storage 204, such as those of the automated cooking application 210. Upon execution by the processor 206, the computer-executable instructions may cause the smart oven 100 to implement one or more of the algorithms and/or methodologies disclosed herein.

The controller 200 may be included in the smart oven 100 and be electrically connected to signaling interfaces of other components of the smart oven 100, thereby allowing the processor 206 of the controller 200 to manipulate the functions of the smart oven 100. For example, the controller 200 may be configured to receive user input from the user interface 120, such as requests to initiate a cooking cycle. The controller 200 may also be configured to control operation of the heating system 122, including to apply power to heating elements of the heating system 122 to warm the cavity 104, as well as to discontinue applying power to the heating element of the heating system 122.

The automated cooking application 210 may artificially generate images of the food item in different doneness levels. To do so, the automated cooking application 210 may utilize a deep neural network (DNN) based image-to-image translation technique that can generate images of cooked food from the raw food image. In an example this may be accomplished using a Generative Adversarial Network (GAN). The GAN architecture is an approach to training a generative model 212 for image synthesis having a generator and a discriminator. The generator takes a point from a latent space as input and generates new plausible images from the domain. The discriminator takes an image as input and predicts whether it is generated or real. A Conditional GAN (CGAN) or a CycleGAN may be used to generate images of the food item based on the image of a food item to be cooked. The CGAN or CycleGAN may utilize an image-to-image translation model to learn mappings between the input image of the raw food and output images in different cooking stages from a training dataset consisting of videos of food being cooked in the smart oven 100. It should be noted, however, that this is only one example, and other types of generative models 212 may be used, such as Variational AutoEncoder (VAE).

The automated cooking application 210 may be configured to receive an image of a food item to be cooked. In an example, the automated cooking application 210 may receive an image of the oven cavity 104 taken by the camera 116. Using the trained generative model 212, the automated cooking application 210 may utilize the generative model 212 to apply the features to the image of the food item that is taken by the camera 116. The generative model 212 may be used to generate multiple images of how the food item might appear in different stages or amounts of cooking.

Figure 3A:
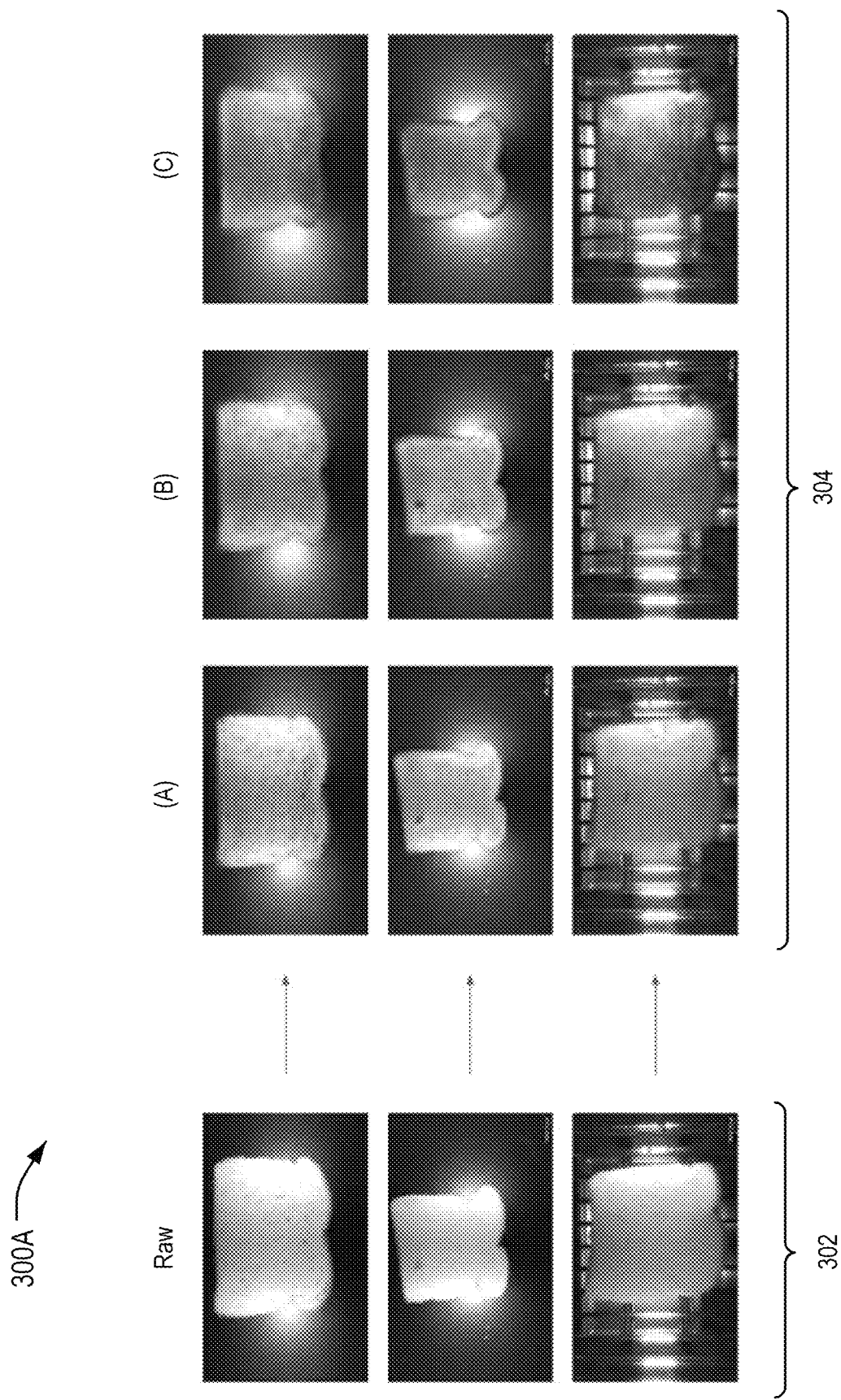
FIG. 3A illustrates an example of synthesized cooked images of raw food items.

FIG. 3A illustrates an example 300A of synthesized cooked images of raw food items. As shown, a set of raw images 302 of bread are input to the generative model 212. Using the generative model 212, synthesized cooked images 304 of the raw images 302 are generated at different levels of doneness. As illustrated in the example 300A, for each of the raw images 302 three different synthesized cooked images 304 are generated, in increasing levels of doneness labeled as (A), (B), and (C). With respect to the bread, it can be seen at the doneness level (A) the bread is lightly toasted, at the doneness level (B) the bread is medium toasted, and at doneness level (C) the bread is well done toasted.

Figure 3B:
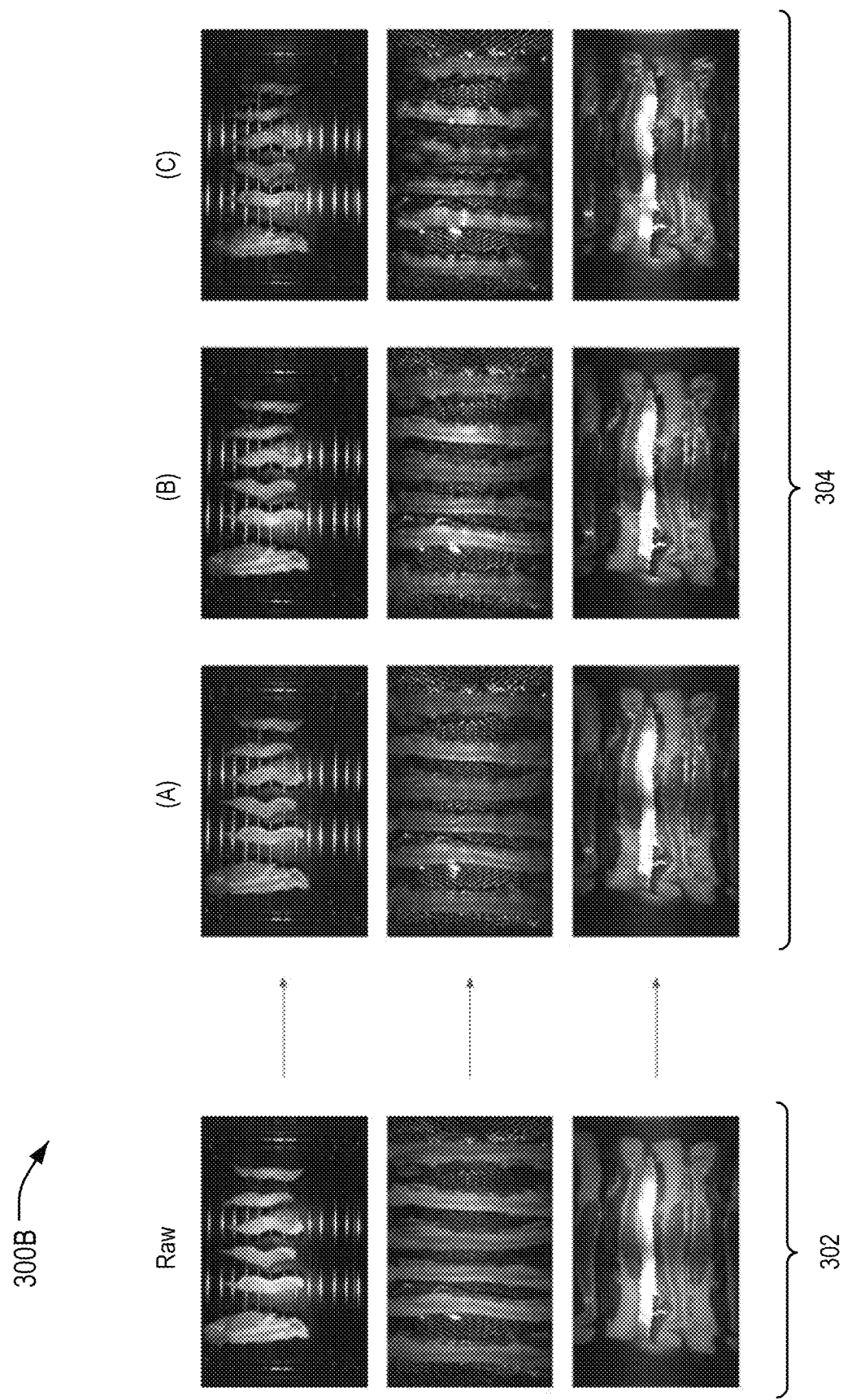
FIG. 3B illustrates an additional example of synthesized cooked images of raw food items.

FIG. 3B illustrates an additional example 300B of synthesized cooked images 304 of raw food items. As shown, a set of raw images 302 of bacon are input to the generative model 212. Using the generative model 212, synthesized cooked images 304 of the raw images 302 are again generated at different levels of doneness. As illustrated in the example 300B, for each of the raw images 302 three different synthesized cooked images 304 are generated, in increasing levels of doneness labeled as (A), (B), and (C). With respect to the bacon, it can be seen at the doneness level (A) the bacon is only beginning to brown, at the doneness level (B) the bacon is more cooked, and at doneness level (C) the bacon is further cooked and exhibits an appearance having foam as well as browning, consistent with actual cooking of bacon.

Figure 4:
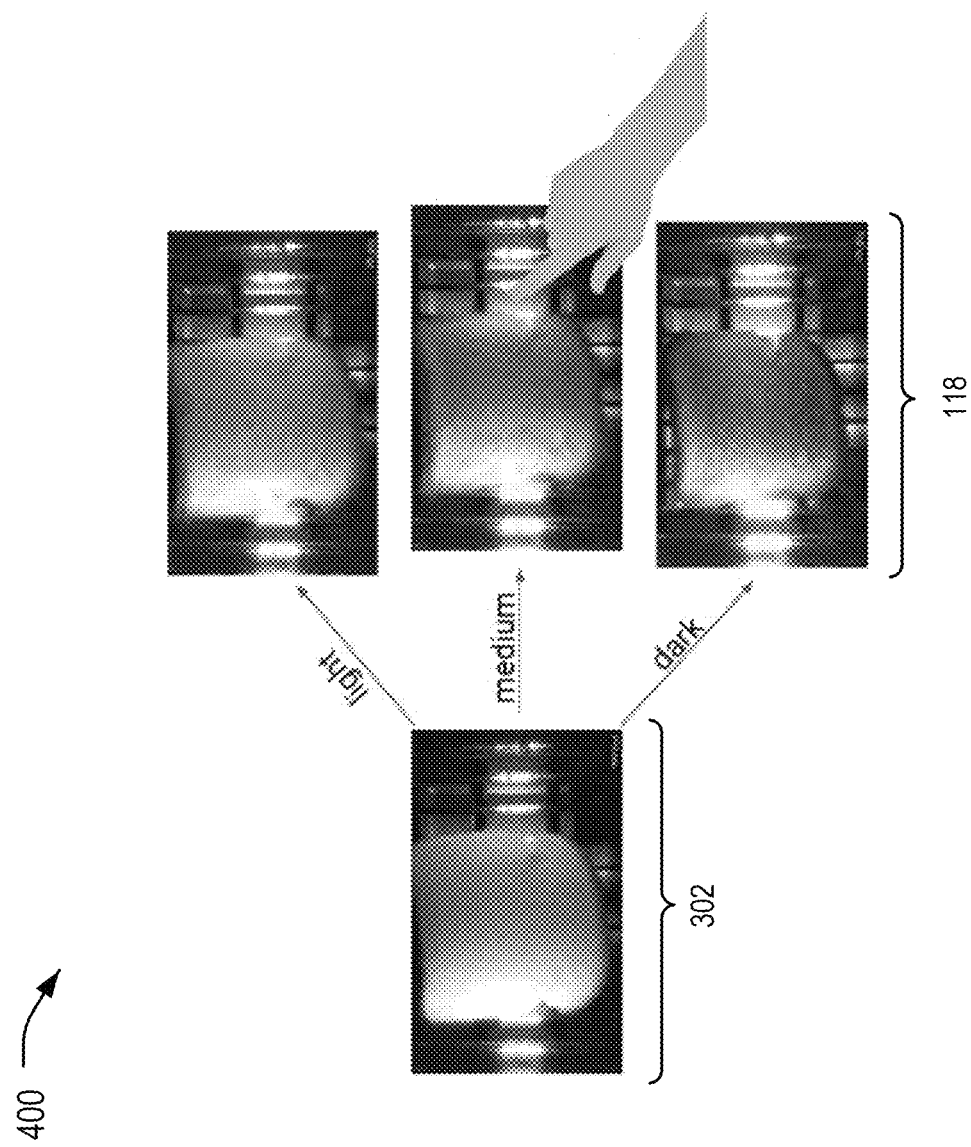
FIG. 4 illustrates an example of a user selection of a level of doneness for cooking of a food item.

FIG. 4 illustrates an example 400 of a user selection of a level of doneness for cooking of a food item. As shown, the automated cooking application 210 may display the generated images of the food item to the user interface 120 for selection by the user. This may allow the user to select an image that shows a desired cooking level for the food item. This feature not only removes the barrier of subjective opinion on the doneness level, but also shows the user how their food item will look after it is cooked, even before the cooking cycle has begun.

The automated cooking application 210 may utilize a doneness detection model 214 to watch the food item to determine the current doneness of the food item as it is cooked. The doneness detection model 214 may be a machine-learning model trained to output a doneness level indicative of the level of doneness of the food item. In an example, the doneness level may be a value scaled from 0 to 1. The doneness detection model 214 may be used to determine a target doneness level for the image of the food item that was selected by the user.

During the cooking cycle, images from the camera 116 may be fed to the doneness detection model 214 to generate current doneness levels for the food item (e.g., also from 0 to 1). The current doneness level may be compared to the target doneness level. Based on the current doneness level, the automated cooking application 210 may determine that the food item has reached the selected cooking level. If the current doneness level is less than the target doneness level, the cooking cycle continues. If the selected level has been reached, the automated cooking application 210 may complete the cooking process and/or notify the user. Accordingly, the smart oven 100 may cook the food item to the selected desired level of doneness.

Figure 5:
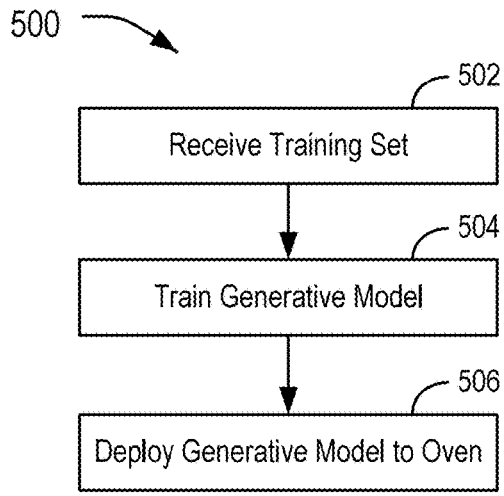
FIG. 5 illustrates an example process for training the generative model to produce images of food items cooked to different levels of doneness.

FIG. 5 illustrates an example process 500 for training the generative model 212 to produce images of food items cooked to different levels of doneness. In an example, the process 500 may be performed by the smart oven 100. However, in many examples, the computationally expensive training aspects of the process 500 may be performed at least in part by a cloud server or other computing device separate from the smart oven 100.

At operation 502, a training data set is received for training of the generative model 212. In one example, the training data set may include food items of a single type, such as all images of toast or all images of bacon. In such an example the generative model 212 may be trained for producing cooked images of a specific type of food item. In another example, the training data set may include food items of multiple types, such as images of toast, bacon, fish, chicken, pie, etc. In such an example the generative model 212 may be trained for producing cooked images of many different types of food item. The data of the training set may additionally be annotated with information indicating the level of doneness of the images. These labels may include, as some non-limiting examples, light, medium, and dark, or raw, medium, and well-done.

At operation 504, the generative model 212 is trained. For example, using the training data the generative model 212 may be trained to learn how the food item changes while cooking and what visual features appear in different stages of the cooking process. Those features include, but are not limited to, changes in color, changes in shape, shrinking, expanding, deforming, melting, rising, and so on. The generative model 212 automatically learns those visual clues from the thousands of videos of cooking food used for its training. Based on the training, the generative model 212 may be able to alter an input image to a specified level of doneness.

At operation 506, the generative model 212 is deployed to the smart oven 100. In an example, the generative model 212 may be copied to the non-volatile storage 204 of the smart oven 100 for use by the automated cooking application 210. After operation 506, the process 500 ends.

Figure 6:
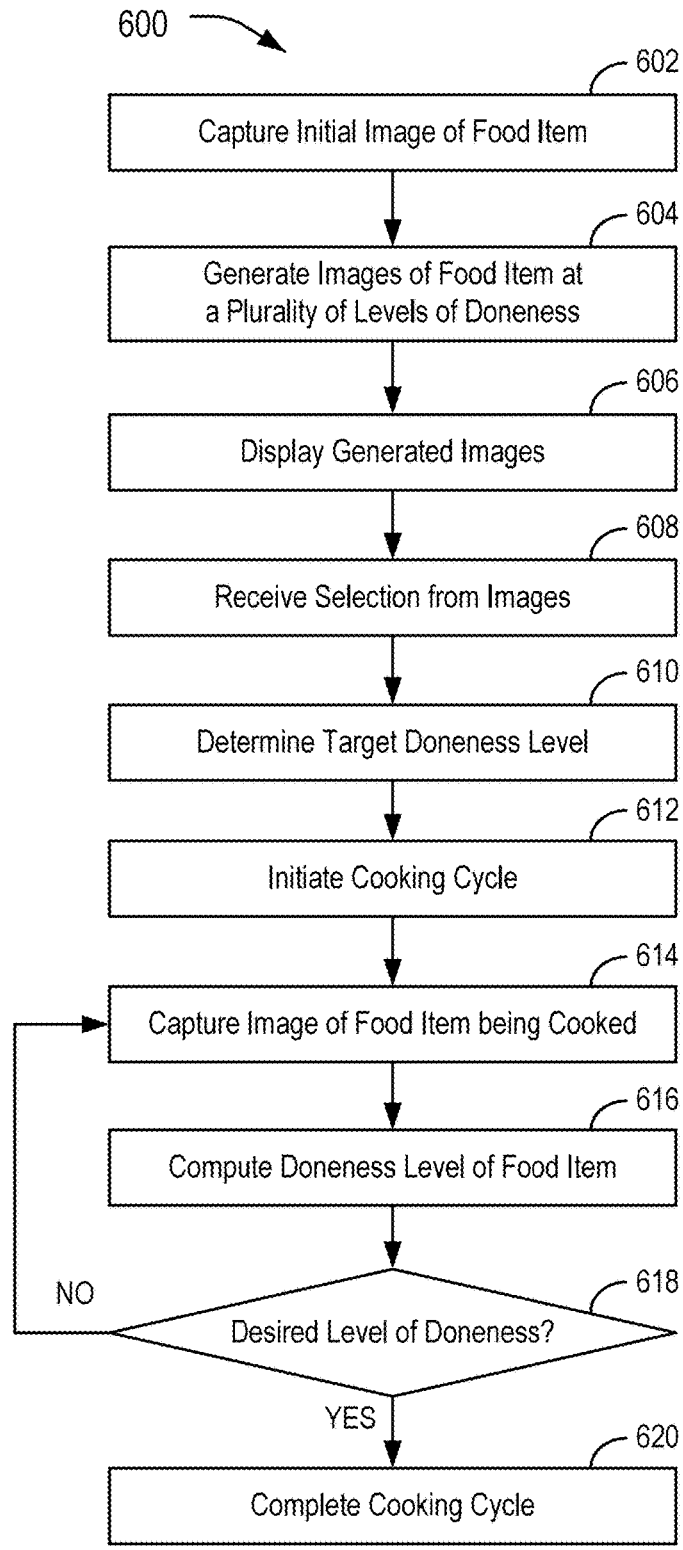
FIG. 6 illustrates an example process for performing real-time automated cooking cycles using generative food doneness prediction.

FIG. 6 illustrates an example process 600 for performing real-time automated cooking cycles using generative food doneness prediction. In an example, the process 600 may be performed by the automated cooking application 210 executed by the processor 206 of the controller 200 of the smart oven 100. The smart oven 100 performing the process 600 may implement the generative model 212 trained by the process 500. The process 600 may be initiated, for example, by a user placing a food item into the cavity 104 of the smart oven 100 and closing the door of the smart oven 100.

At operation 602, the smart oven 100 captures an initial raw image 302 of a food item. In an example, the raw images 302 of the food item may be captured by the camera 116 in the cavity 104 of the smart oven 100.

At operation 604, the smart oven 100 generates synthesized cooked images 304 of the food item at a plurality of levels of doneness. In an example, the smart oven 100 utilizes the generative model 212 to generate synthesized cooked images 304 of the raw images 302 at different levels of doneness.

At operation 608, the smart oven 100 receives a selection of one of the plurality of levels of doneness. In an example, as shown in FIG. 4, a user may provide a selection of one of the synthesized cooked images 304 via the user interface 120 of the smart oven 100.

At operation 610, the smart oven 100 determines a target doneness level based on the selected synthesized image of the cooked food 304. In an example, the smart oven 100 utilizes a doneness detection model 214 to score the doneness level of the synthesized cooked images 304. This, accordingly, results in a target doneness score indicative of the relative level of doneness of the food item depicted in the synthesized cooked images 304.

At operation 612, the smart oven 100 initiates a cooking cycle. For instance, the smart oven 100 may activate the heating system 122 to begin applying heat to the food item in the oven cavity 104.

At operation 614, the smart oven 100 captures an image of the food item undergoing the cooking cycle. In an example, and similar to operation 602, the smart oven 100 utilizes the camera 116 to capture an image of the food item in the cavity 104.

At operation 616, the smart oven 100 determines a doneness level of the food item using the image of the food item. In an example, and similar to as done at operation 610, the smart oven 100 utilizes the doneness model 214 to score the doneness level of the synthesized cooked images 304. This results in a current doneness score indicative of the relative level of doneness of the food item being cooked in the cavity 104 of the smart oven 100.

At operation 618, the smart oven 100 determines whether the desired level of doneness has been reached. For instance, the smart oven 100 may compare the doneness level of the food item determined at operation 616 with the target doneness level determined at operation 610. If the doneness level of the food item has reached the doneness level determined at operation 610 from the selected synthesized cooked image 304, control passes to operation 620 to complete the cooking cycle. If not, control returns to operation 614 to capture an additional image of the food item.

At operation 620, the smart oven 100 completed the cooking cycle. In an example, the smart oven 100 discontinues operation of the heating system 122. This may, for example, discontinue operation of the heating system 122. Or, this may set the heating system 122 to a warming mode to keep the food item ready for use. In another example, the smart oven 100 may display or sound an alert to indicate that preparation of the food item is complete. After operation 620, the process 600 ends.

Thus, by using a generative model, synthesized images of the cooked food item are generated at different levels of doneness based on the raw image. A selection of one of the synthesized images is received. The food item is cooked to the levels of doneness corresponding to the one of the synthesized images of the cooked food. Moreover, variations on the disclosed approach are possible. In an example, a model may be used to estimate a doneness time for the food item based on the selected appearance. This doneness time may be additionally placed on the user interface to inform the user of the approximate amount of time required to cool the raw food item to the desired amount.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

The flowcharts and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for controlling a heating process, comprising:
capturing, by a camera configured to capture images within a cavity of the smart oven, a raw image of a food item;
generating, using a generative model, a plurality of synthesized images of the food item within the cavity cooked to different levels of doneness based on the raw image;
displaying the plurality of synthesized images to a user interface for selecting an image that shows a desired cooking level for the food item;
receiving a selection of one of the synthesized images of cooked food from the user interface; and
cooking the food item to the levels of doneness corresponding to the one of the synthesized images of cooked food using a heating system configured to heat the cavity.

2. The method of claim 1, further comprising:
utilizing a doneness detection model to determine a target doneness level for the food item based on the one of the synthesized images of cooked food;
utilizing the doneness detection model to determine a current doneness level of the food item according to an image captured of the food item in real time; and
utilizing the current doneness level and the target doneness level to control a heating system to cook the food item.

3. The method of claim 2, further comprising:
initiating a cooking cycle to begin cooking the food item by activating the heating system; and
completing the cooking cycle responsive to the current doneness level reaching at least a minimum doneness likelihood threshold specified by the target doneness level.

4. The method of claim 3, wherein completing the cooking cycle includes one or more of deactivating the heating system, setting the heating system to a warming mode to keep the food item ready for use, or providing an alert to indicate that preparation of the food item is complete.

5. The method of claim 1, further comprising training a generative model using a training data set of images of food items at different levels of doneness.

6. The method of claim 1, wherein the generative model is a Generative Adversarial Network (GAN).

7. The method of claim 1, wherein the generative model is a Variational AutoEncoder (VAE).

8. A smart oven for controlling a heating process, comprising:
a camera configured to capture images within a cavity of the smart oven;
a heating system configured to heat the cavity;
a user interface of the smart oven; and
a processor, programmed to
capture a raw image of a food item within the cavity using the camera,
generate, using a generative model, a plurality of synthesized images of the food item cooked to different levels of doneness based on the raw image,
display the plurality of synthesized images of the food item to the user interface,
receive a selection of one of the synthesized images of cooked food from the user interface, and
cook the food item within the cavity, using the heating system, to the level of doneness corresponding to the one of the synthesized images of cooked food selected from the user interface.

9. The smart oven of claim 8, wherein the processor is further programmed to:
utilize a doneness detection model to determine a target doneness level for the food item based on the one of the synthesized images of cooked food;
utilize the doneness detection model to determine a current doneness level of the food item according to an image captured of the food item in real time; and
utilize the current doneness level and the target doneness level to control a heating system to cook the food item.

10. The smart oven of claim 9, wherein the processor is further programmed to:
initiate a cooking cycle to begin cooking the food item by activating the heating system; and
complete the cooking cycle responsive to the current doneness level reaching at least a minimum doneness likelihood threshold specified by the target doneness level.

11. The smart oven of claim 10, wherein completing the cooking cycle includes one or more of deactivating the heating system, setting the heating system to a warming mode to keep the food item ready for use, or providing an alert to indicate that preparation of the food item is complete.

12. The smart oven of claim 8, wherein the generative model is trained using a training data set of images of food items at different levels of doneness.

13. The smart oven of claim 8, wherein the generative model is a Generative Adversarial Network (GAN).

14. The smart oven of claim 8, wherein the generative model is a Variational AutoEncoder (VAE).

15. A non-transitory computer-readable medium comprising instructions controlling a heating process that, when executed by a processor of a smart oven, causes the smart oven to perform operations including to:
capture, by a camera configured to capture images within a cavity of the smart oven, an image of raw food item;
generate, using a generative model, a plurality of synthesized images of the cooked food item cooked to different levels of doneness based on the raw image;
display the plurality of synthesized images to a user interface for selecting an image that shows a desired cooking level for the food item;
receive a selection of one of the synthesized images of cooked food from the user interface; and
cook the food item to the levels of doneness corresponding to the one of the synthesized images using a heating system configured to heat the cavity.

16. The medium of claim 15, further comprising instructions that, when executed by the processor of the smart oven, cause the smart oven to perform operations including to:
utilize a doneness detection model to determine a target doneness level for the food item based on the one of the synthesized images of cooked food;
utilize the doneness detection model to determine a current doneness level of the food item according to an image captured of the food item in real time; and
utilize the current doneness level and the target doneness level to control a heating system to cook the food item.

17. The medium of claim 16, further comprising instructions that, when executed by the processor of the smart oven, cause the smart oven to perform operations including to:

initiate a cooking cycle to begin cooking the food item by activating the heating system; and complete the cooking cycle responsive to the current doneness level reaching at least a minimum doneness likelihood threshold specified by the target doneness level.

18. The medium of claim 17, wherein completing the cooking cycle includes one or more of deactivating the heating system, setting the heating system to a warming mode to keep the food item ready for use, or providing an alert to indicate that preparation of the food item is complete.

19. The medium of claim 15, further comprising instructions that, when executed by a processor of a server, cause the server to perform operations including to:

train the generative model using a training data set of images of food items at different levels of doneness; and deploy the generative model to the smart oven.

20. The medium of claim 15, wherein the generative model is one of a Generative Adversarial Network (GAN) or a Variational AutoEncoder (VAE).

* * * * *